(No Model.)

J. H. WHITAKER.
HARNESS.

No. 336,367. Patented Feb. 16, 1886.

Witnesses:

Inventor:
John H. Whitaker

UNITED STATES PATENT OFFICE.

JOHN H. WHITAKER, OF DAVENPORT, IOWA.

HARNESS.

SPECIFICATION forming part of Letters Patent No. 336,367, dated February 16, 1886.

Application filed November 9, 1885. Serial No. 182,169. (No model.)

*To all whom it may concern:*

Be it known that I, JOHN H. WHITAKER, of Davenport, in the county of Scott and State of Iowa, have invented a new and useful Improvement in Harness, of which the following is a description.

Figure 1:
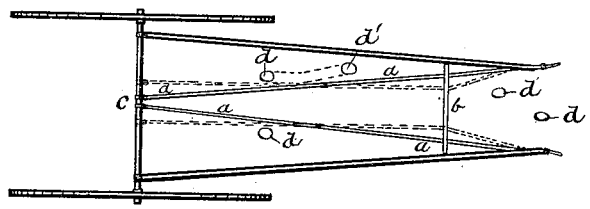
Figure 2:
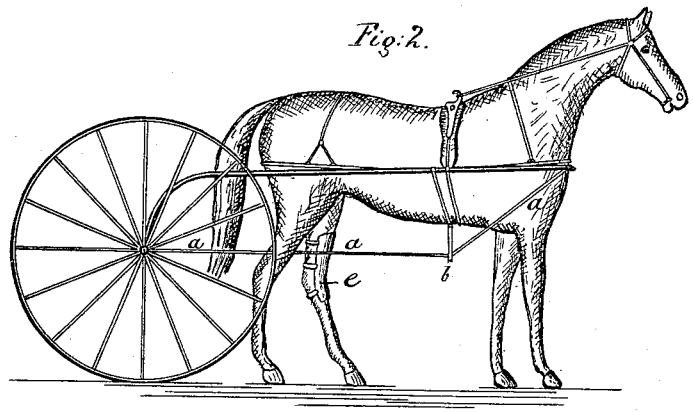

Figure 1 represents a top view or plan of a trotting-vehicle with my invention applied thereto. Fig. 2 is a side view of the same, showing the relation of the parts to the horse.

My invention is in the nature of a new and useful improvement in harness to improve the trotting of the horse.

The object is to guide the hind feet of the horse while trotting or running, so as to force the horse to keep his hind feet out of the path of the fore feet, and thus avoid striking the latter. I attain this object by attaching to the ends of the shaft the lines $a\,a$ and leading these lines to a brace, $b$, or other support under the body of the horse, behind the front legs, and extending them to the rear between the horse's hind legs, and fastening said lines to the axle $c$ or any other convenient point of attachment on the vehicle.

Instead of drawing the lines converging, as shown, they may be drawn parallel from the brace to the rear point of attachment, as shown in dotted lines in Fig. 1; or the lines may cross each other, so as to bring the intersecting point of the two lines in front of the axle.

In Fig. 1, $d\,d\,d\,d$ represent the position of the feet, and $d'$ represents the direction of movement of the hind feet, which is effected by the use of my invention.

To prevent chafing and rendering the horse's legs sore, pads $e$ are attached to his thighs where the lines strike.

Having thus described my invention, what I claim as new is—

1. A harness for causing the hind legs of a horse to be spread apart, consisting of two lines, $a\,a$, connected to and combined with a brace, $b$, adapted to be secured under the belly of the horse, while the ends of the lines are secured, respectively, to the ends of the shaft and the body of the vehicle, and pass between the horse's hind legs, as shown and described.

2. The combination, with the vehicle and its shafts, of the brace $b$, arranged beneath the belly of the horse, and the lines $a\,a$, fastened at their front ends to the shafts outside of the fore legs, connected to the brace $b$, and then extended between the hind legs and fastened to the vehicle, substantially as and for the purpose described.

JOHN H. WHITAKER.

Witnesses:
JOHN G. OTTEN,
T. G. CLAUSEN.